(12) United States Patent
Mossi

(10) Patent No.: US 11,117,220 B2
(45) Date of Patent: Sep. 14, 2021

(54) LASER MARKING EQUIPMENT

(71) Applicant: TECNOMEC SA, Stabio (CH)

(72) Inventor: James Mossi, Stabio (CH)

(73) Assignee: Tecnomec SA, Stabio (CH)

( * ) Notice: Subject to any disclaimer, the term of this patent is extended or adjusted under 35 U.S.C. 154(b) by 0 days.

(21) Appl. No.: 16/976,524

(22) PCT Filed: Feb. 26, 2019

(86) PCT No.: PCT/IB2019/051530
§ 371 (c)(1),
(2) Date: Aug. 28, 2020

(87) PCT Pub. No.: WO2019/166942
PCT Pub. Date: Sep. 6, 2019

(65) Prior Publication Data
US 2021/0046589 A1 Feb. 18, 2021

(30) Foreign Application Priority Data
Feb. 28, 2018 (IT) .......................... 102018000003131

(51) Int. Cl.
*B23K 26/362* (2014.01)
*E06B 9/06* (2006.01)
*B23K 26/70* (2014.01)
*E06B 9/11* (2006.01)

(52) U.S. Cl.
CPC .......... *B23K 26/362* (2013.01); *B23K 26/706* (2015.10); *E06B 9/0607* (2013.01); *E06B 9/11* (2013.01)

(58) Field of Classification Search
CPC ....... B23K 26/362; B23K 26/706; E06B 9/11; E06B 9/0607
See application file for complete search history.

(56) References Cited

U.S. PATENT DOCUMENTS

| 5,129,611 | A | 7/1992 | Grover et al. |
| 2007/0023406 | A1 | 2/2007 | Heberer |

FOREIGN PATENT DOCUMENTS

| DE | 202010007645 U1 | 8/2010 | |
| EP | 3257638 A1 | 12/2017 | |
| FR | 2848499 A1 * | 6/2004 | ............... B44B 7/00 |
| JP | 62021492 A * | 1/1987 | ............. B23K 26/12 |
| JP | 2006192454 A * | 7/2006 | |

* cited by examiner

*Primary Examiner* — Geoffrey S Evans
(74) *Attorney, Agent, or Firm* — Bay State IP, LLC

(57) ABSTRACT

It is disclosed a laser marking apparatus provided with a protection shield, comprising a support frame (T) of a working deck (2) and wherein, around said working deck, a protection shield is arranged which fully encircles the working area of said laser marking head (4) and provided with at least partly perimetrally upright arranged panels with respect to said working deck, wherein said panels (P1-P8) are mounted movable from a lower position, wherein said shield encircles said support frame (T) up to a height completely below or flush with the upper surface of said working deck (2), to an upper extended position wherein said shield encircles the area above said working deck (2) up to a working height of said laser marking head (4).

10 Claims, 7 Drawing Sheets

LASER MARKING EQUIPMENT

CROSS REFERENCE TO RELATED APPLICATION

This application is for entry into the U.S. National Phase under § 371 for International Application No. PCT/IB2019/051530 having an international filing date of Feb. 26, 2019, and from which priority is claimed under all applicable sections of Title 35 of the United States Code including, but not limited to, Sections 120, 363, and 365(c) and which in turn claims priority under 35 USC 119 to Italian Patent Application No. 102018000003131 filed on Feb. 28, 2018.

FIELD OF THE INVENTION

The present invention relates to an improved laser marking apparatus, in particular a laser marking apparatus provided with a protective shield.

PRIOR STATE OF THE ART

As known, laser markers are apparatuses that employ a laser source, suitably focused and driven, to indelibly impress marks (brand, lot number, serial number, . . . ) on production pieces, typically metal, but also plastic and organic workpieces. For such function, laser markers are typically equipped with a mobile unit that uses a medium and/or high power laser source: this is why they represent a potential source of health risk for workers (under operating conditions that require regulations above the risk class II). Therefore, it is essential that these apparatuses are suitably protected to avoid accidentally exposing operators to direct laser light.

Currently the protection is obtained by arranging the apparatus as an isolated booth, equipped with controlled access, inside which there is a laser marker provided with its laser source and respective optics. This access control implies that the laser marker can operate only when the protection system is in an appropriate position, which prevents the presence of the operators in close proximity to the laser marker working area. See for example US2007/0023406.

The shielding booth of the laser marker determines a sort of stable protection, which encloses the access perimeter to the working area of the laser source. The booths have access doors that are opened for the introduction of workpieces and then closed again during operation. The protection booths are also widely used in other sectors of machine tools and sometimes they can also offer some solutions to reduce the overall bulk when the machine tool is not operating: EP3257638, for example, discloses a downwards collapsible cabinet, in which the machine tool also lowers downwards when it is not in use. Similar collapsible booth solutions are described in DE202010007645U and U.S. Pat. No. 5,129,611.

It is evident that such solutions involve operating limits on the dimensions of the workpieces that can be marked. In fact, the space occupied by the booth, and therefore the size of the access doors, does not allow to introduce pieces of significant size when the marker is in operating order. The limits of these solutions are determined both by the access door dimensions, but also by the fact that the workpiece must be introduced by a vertical access compartment and therefore must be typically placed by hand or by a robotic arm: this limits the access of heavy parts that, for example, must be transferred with a forklift or an overhead crane and therefore require access from above or transversely to the working deck of the laser marker.

Alternatively, it is possible to operate in the opposite way, i.e. a large working area is destined to the laser marker—which can be accessed comfortably and freely by any means—and then it is possible to limit the access of operators to the area before starting the apparatus: typically this is achieved by installing the laser marker in a room with a controlled access door. This solution is unwelcome because it obliges users to dedicate an entire working area to the laser marker, including large required distances that are then unusable by the operators during the operation of the laser marker.

As understandable, none of these techniques is therefore completely satisfactory.

Problem and Solution

The object of the present invention is to overcome the drawbacks of the prior art as set forth above. In particular, it is intended to provide a marking apparatus that can work in protected conditions, without forcing an entire access area to be dedicated and without the limits of known protection apparatuses.

This object is achieved by the features mentioned in the independent claim. The dependent claims describe preferred features of the invention.

In particular, according to a first aspect of the invention, a laser marking apparatus is provided herein, comprising a support frame of a working deck and a laser marking head operating above said working deck, and wherein a protection shield is arranged around said working deck, which fully encircles the working area of said laser marking head and provided with panels at least partly perimetrally upright arranged with respect to said working deck, wherein said panels are mounted movable from a lower position, wherein said shield surrounds said support frame up to a height completely below or flush with the upper surface of said working deck, to an upper extended position wherein said shield surrounds the area above said working deck up to a working height of said laser marking head.

According to another aspect, vertically upright panels are mounted vertically slidable with a rigid displacement. Alternatively, each of the panels consists of a plurality of sub-panels arranged side-by-side and at least partly mutually movable by means of a telescopic mechanism. Preferably, at least part of said sub-panels are in the shape of winding flexible shields.

According to a preferred aspect, at least one front panel is mounted movable autonomously from the other panels. In particular, the front panel is mounted free to slide vertically and constrained by a pneumatic dampener adjusted to support the weight of said panel and to inhibit the descent thereof due to gravity.

According to a variant, the shield panels also comprise an upper closing panel extendable from a backward closed-up position to a forward extended position. In particular, the upper closing panel is in the shape of a roller shutter or of a plurality of telescopically extendable sub-panels.

According to another aspect, at least one of the perimetrally upright arranged panels is offset from the working deck so as to define a vertically extending compartment, in which the laser marking head is movably housed. In this case, an upper opening of the compartment is closable by at least part of the upper closing panel when the perimetrally upright arranged panels are in the lower position.

BRIEF DESCRIPTION OF THE DRAWINGS

Further features and advantages of the invention will anyhow be more evident from the following detailed description of a preferred embodiment, given by mere way of non-limiting example and illustrated in the accompanying drawings, wherein.

DETAILED DESCRIPTION OF PREFERRED EMBODIMENTS

Figure 1A:
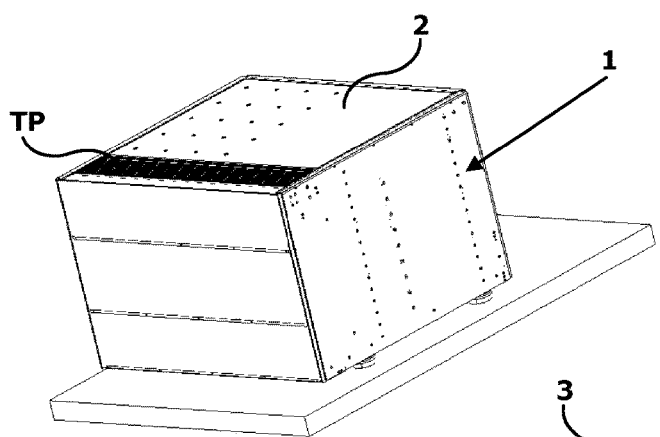
FIG. 1A is a top perspective view, of a first embodiment of the apparatus according to the invention in a lowered shield home condition.

FIG. 1A shows an apparatus according to a first embodiment of the invention, in a non-operating condition.

It should be noted a perimeter shield 1 which encicles a lower area of a support frame T which supports a working deck 2.

More precisely, the frame T consists of lattice elements T1 and T2 which define a mobile support structure for the perimeter shielding 1 (as will be explained below) and for stable constraint of the working deck 2.

The working deck 2 is integral with the frame T and constitutes the support plane for the workpieces during operation of the laser marker. Deck 2 therefore defines a flat, stable and sufficiently hard and resistant surface to support even pieces of significant weight. For this purpose, the deck 2 is preferably in the form of a plate of rigid and stable material (for example granite) of the type used in machine tools or precision scanning probes.

Figure 1B:
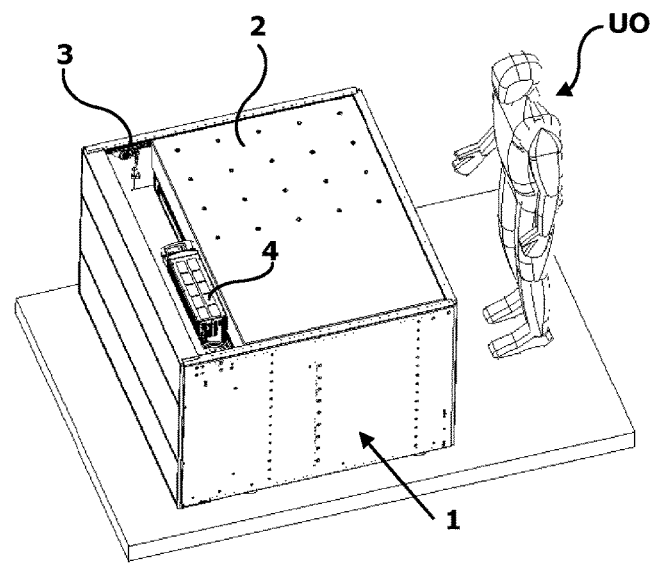
FIG. 1B is a perspective view of the apparatus of FIG. 1A in an open condition of a laser marker housing compartment.
Figure 2:
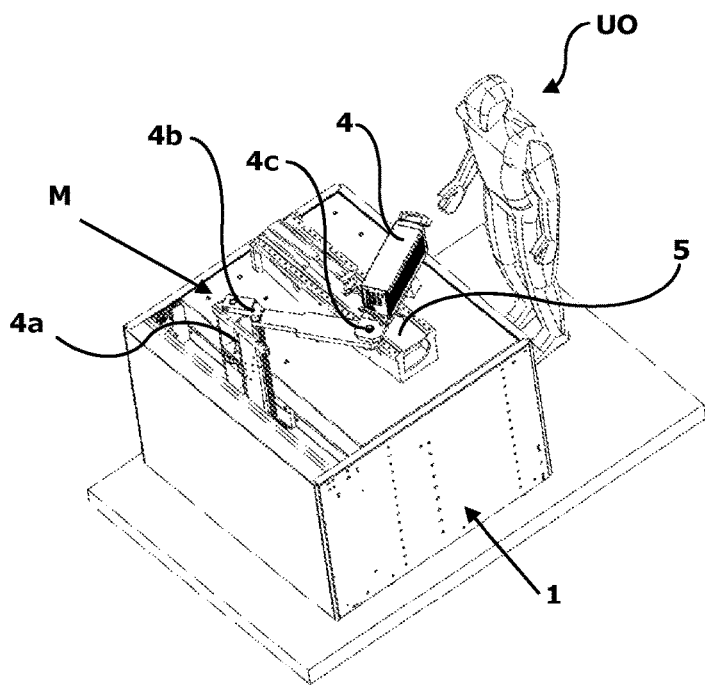
FIG. 2 is a perspective view of the apparatus of FIG. 1A, in a set-up condition.

The frame T supports the working deck 2 at a suitable height so that an operator OU can access it comfortably. Furthermore, the perimeter shielding 1, in the non-operating condition as illustrated in FIGS. 1A-2, has a height such as to remain flush or in any case entirely below the upper surface of the working deck 2 when it is in its lowered position: in this way, it is possible to access the working deck comfortably, both sideways that from above, without interfering with the perimeter shielding that remains entirely at a lower level.

At least on one side of the working deck 2—in the figures, a back side of a generally rectangular plan shape (even if the deck 2 could have also a regular or irregular polygonal shape, having more than four sides, or other shapes)—the perimeter shielding 1 is arranged at a certain distance from the edge of the working deck 2 (see FIG. 1B), so as to define a compartment 3 vertically accessible between the plane 2 and the corresponding side of the perimeter shield 1. In this compartment 3 movement means M are accommodated, said means being suitable for raising and lowering, respectively above and below the level of the working deck 2, a laser marking head 4, as better described in the following.

According to the preferred embodiment shown, the other three sides of the perimeter shielding are arranged adjacent to the side and front edges of the working deck 2, so as to occupy the area of minimum size with respect to the plant footprint of the working deck 2.

Preferably, as made evident by the comparison of FIGS. 1A and 1B, the compartment 3 for housing the marking head is provided at the top with a movable cover, for example a portion of an extendable shutter TP, as better described below.

FIG. 2 shows the apparatus in a set-up condition, in which a piece 5 to be marked was deposited on the working deck 2 and the marking head 4 is extracted from the compartment 3 and arranged in operating condition.

As can be seen from FIG. 2, the movement means M comprise a simple or telescopic vertical guide 4a, with its own driving device, an articulated arm 4b and an engaging articulation 4c for a marking laser head 4. It is not necessary to explain in detail the component parts of the laser marker 4, as these are elements commercially available from the mark, for example the UNIQ™ model of the Datalogic™ company.

Figure 3:
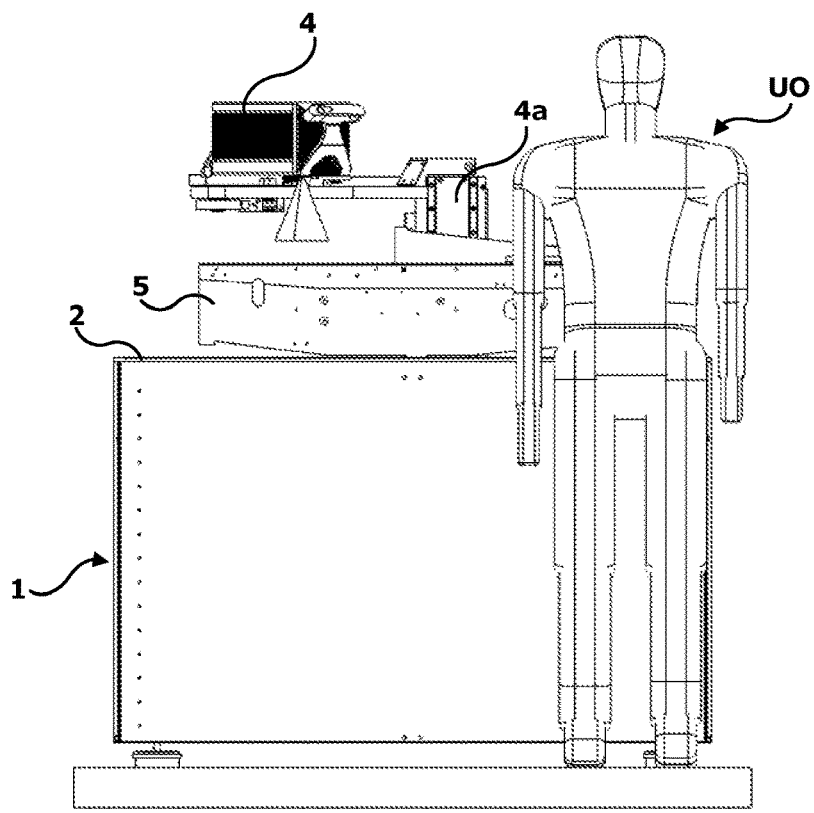
FIG. 3 is a front elevation view of the apparatus of FIG. 2.

The elements illustrated above are also visible in the front view of FIG. 3, showing the upward development of these elements, with respect to the height of a medium height operator CU. In this figure it is further noted that the whole of these elements, including the workpiece 5 to be marked, has a height from the working deck 2 of a height lower than the height of the perimeter shield 1 and therefore of the height of the working deck 2 from the ground.

The perimeter shield 1 is mounted on the frame T in a vertically extensible way, so as to be displaced from a lowered attitude—in which it encircles the frame T and remains entirely at a level lower than that of the working deck 2 (FIGS. 1A-3)—to a raised attitude—in which it delimits at least the sides of the working deck at the height of the marking head 4.

According to a first embodiment illustrated in FIGS. 4-10, the perimeter shield is in the form of vertically sliding mounted panels. Although the entire side surface of the perimeter shield 1 can move integrally upwards and downwards, preferably at least one of its front portions is mounted vertically movable independently of the remaining shield 1 portions: this makes easier the access by the operator OU when it is necessary to use the apparatus with frequent batches of small pieces to be marked, as will be seen further on.

Figure 4:
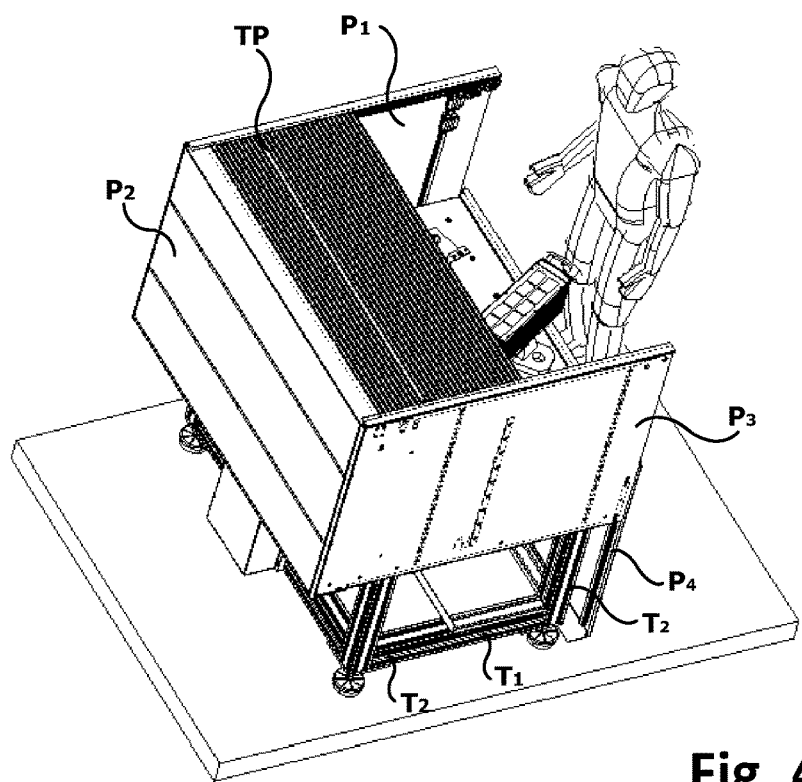
FIG. 4 is a perspective view of the same apparatus of FIG. 3, in a first closing condition of the protection shield.

FIG. 4 shows the structure of the perimeter shield 1 in a fully vertically raised position. It can be noted that the perimeter shield 1 in this case consists of three integral panels P1, P2 and P3 on the two sides and on the back side, while a fourth front panel P4 is vertically sliding on the frame T independently (in FIG. 4 it is in the lowered position).

This provision is not binding, in the sense that other arrangements could be provided in which the walls of the perimeter shield move vertically in a different way.

Possibly also the upper side can be closed. In this case, on the upper side there is provided a shutter TP, horizontally slidable and extensible by a collection fold TP' which is housed in the rear compartment 3 (see FIGS. 5-7-10).

The upper shutter TP, in the completely folded position (FIG. 1B), is located TP' housed inside the rear compartment 3, while in the fully extended position (FIG. 6) it extends horizontally, above the working deck 2, by sliding in proper lateral guides, at a height higher than the various elements of the laser marker 4.

When the perimeter shield 1 is completely lowered (FIG. 1A), the shutter TP—which is part of the shield—is necessarily folded so as not to interfere with the deck 2. In the case where a compartment 3 for housing the head 4 is provided, when the latter is in a non-operating position, the shutter TP can be briefly extended to close the compartment 3 above, until it abuts against the rear edge of the working deck 2.

Figure 5:
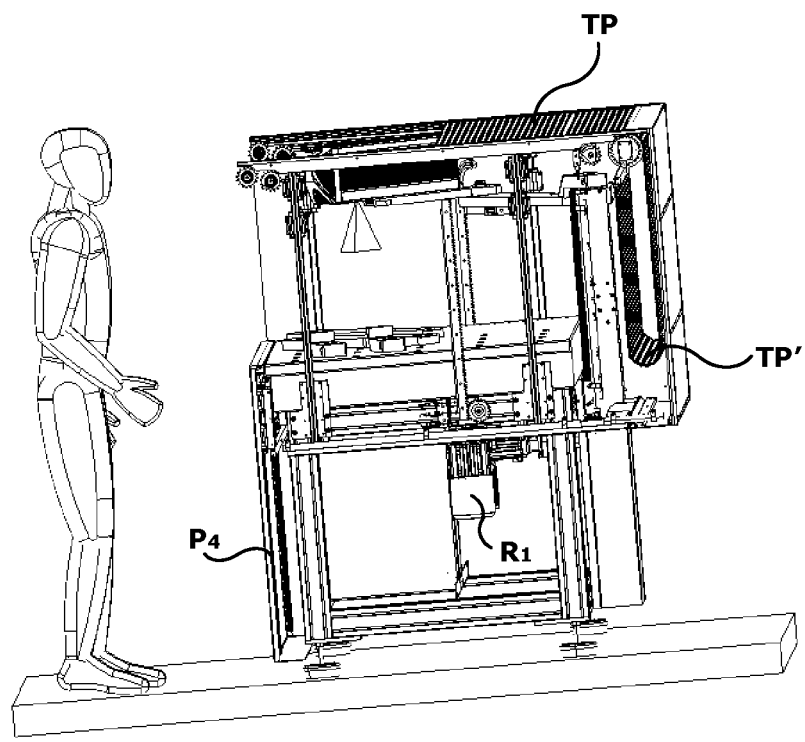
FIG. 5 is a side elevation view of the apparatus of FIG. 4 with partially removed parts.
Figure 6:
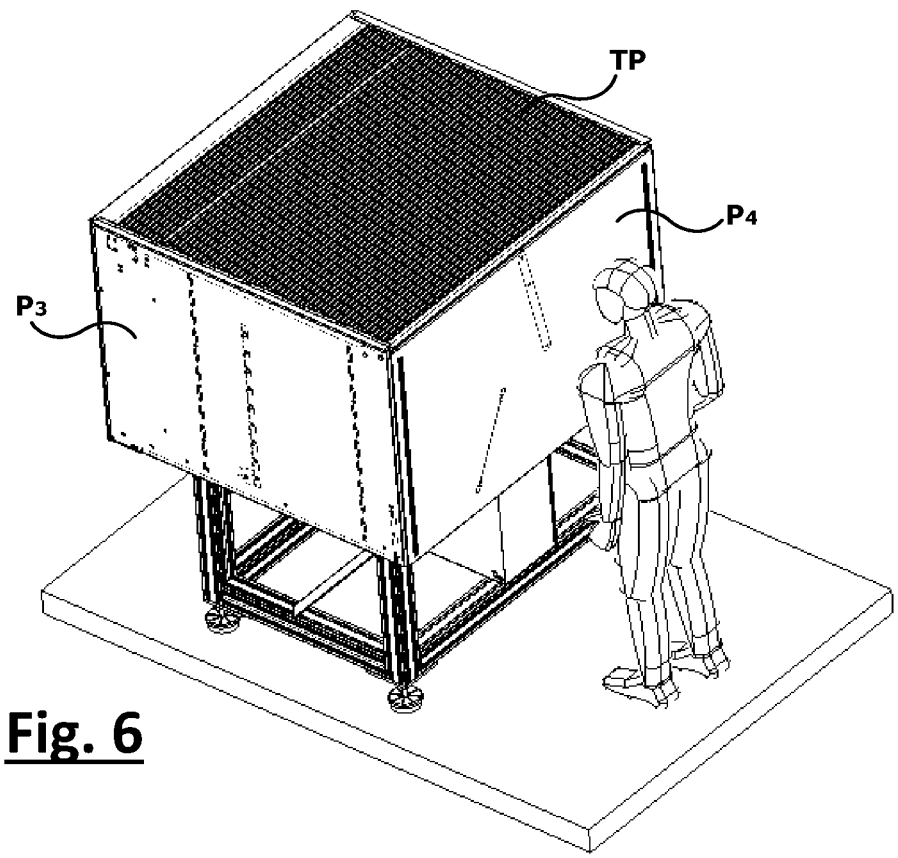
FIG. 6 is a top perspective view of the same apparatus of FIG. 4, in an operating condition of the marker with completely closed protection shield.
Figure 7:
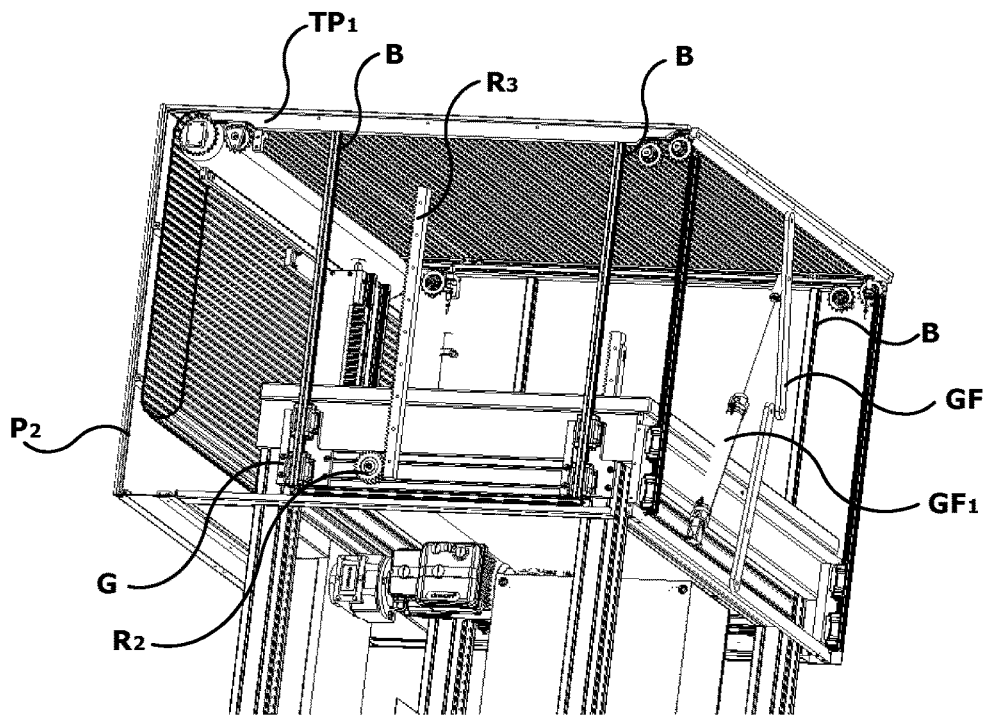
FIG. 7 is a perspective view from one side and from the front, with partially removed parts, of the first embodiment in the operating condition of FIG. 6.
Figure 8:
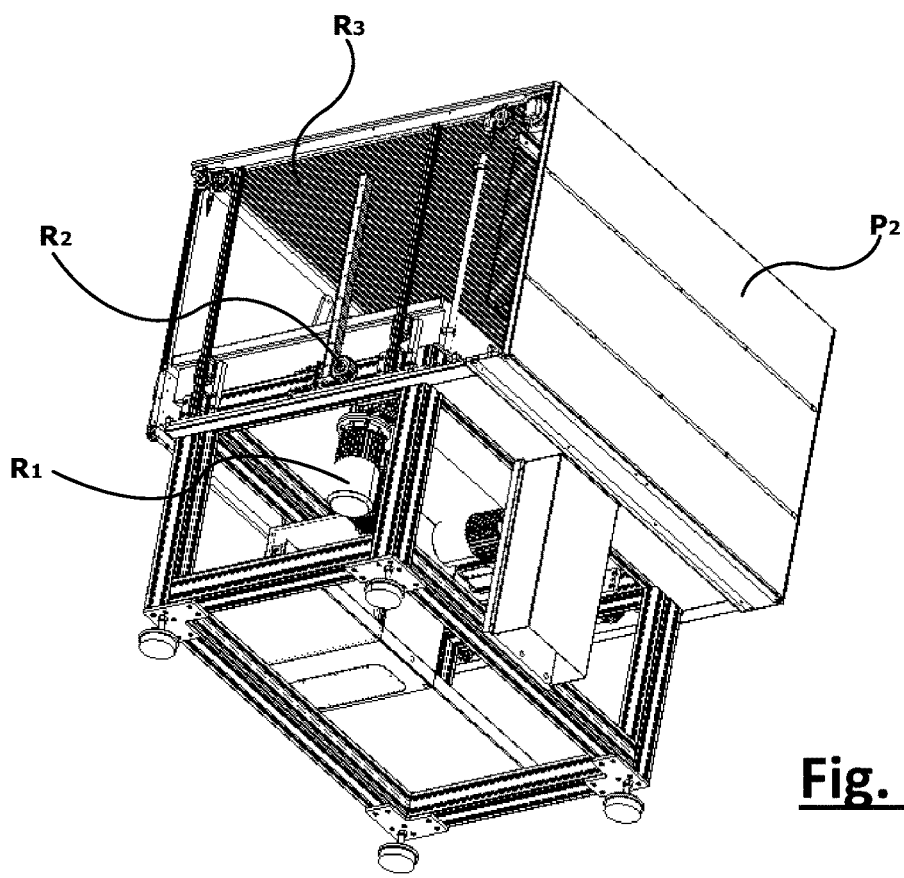
FIG. 8 is a perspective view from one side and from the rear similar to that of FIG. 7.
Figure 9:
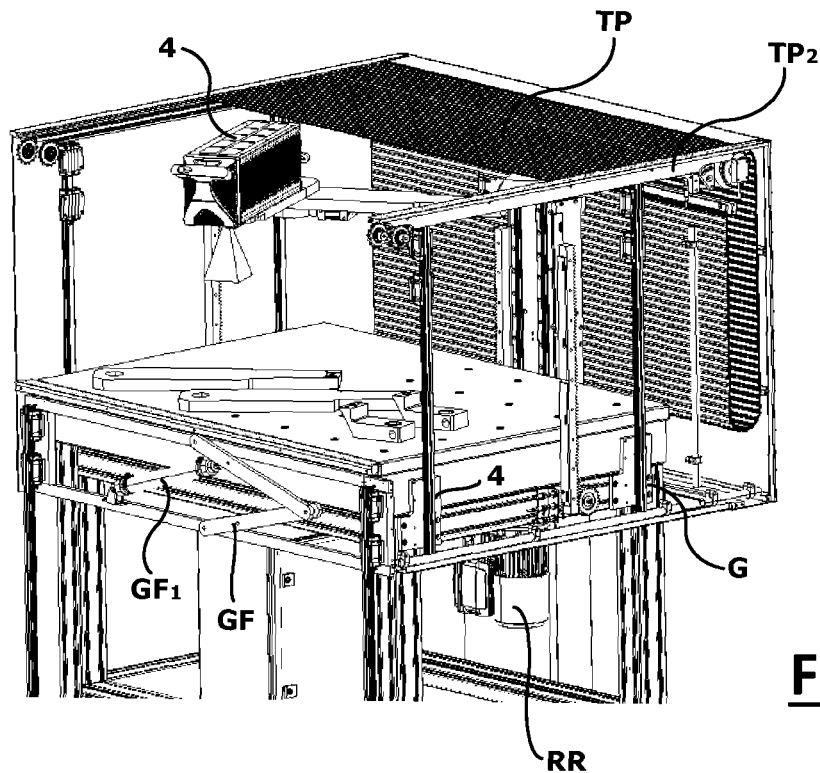
FIG. 9 is another perspective view similar to that of FIG. 7 with the marker in operation.
Figure 10:
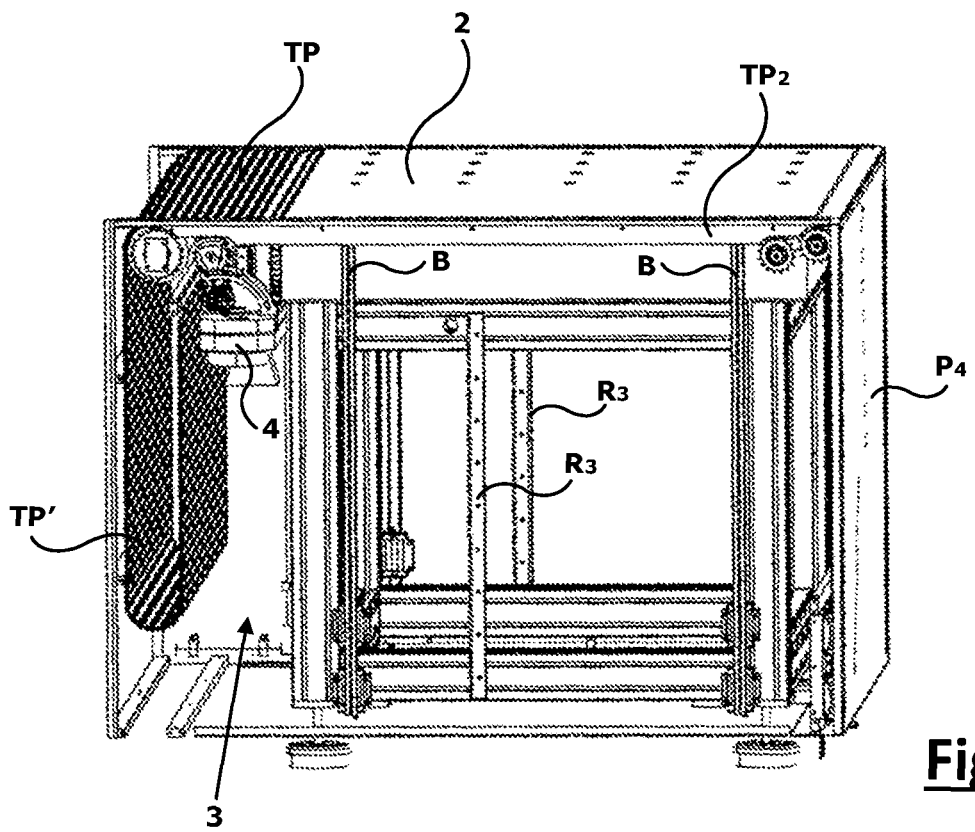
FIG. 10 is a perspective view with removed parts of the apparatus of FIG. 1A.

It should be noted that the operating condition of the apparatus—that is, the one that generates the consent to start the laser marking head 4—is not that shown in FIGS. 4 and 5, but that in FIG. 6, in which also the front panel P4 was in turn completely lifted and the shutter TP was moved horizontally forward, until reaching the upper edge of the panel P4, to complete the closure of the perimeter shield around the marking laser head 4.

The fact that the front panel P4 has a vertical movement independent of the remaining perimeter shield portion, entails operating advantages. In fact, when the apparatus of the invention must be used in a traditional way, that is to mark small and handy workpieces, the perimeter shield 1 can be left in the raised/extended arrangement shown in FIG. 5 while acting only on the panel P4, lowering it or lifting it every time it is necessary to introduce and extract the pieces to be marked. The provision of a closing and opening of only the front panel P4 obviously makes the parts change operations, and therefore the productivity of the machine, faster. When, on the contrary, it is desired to exploit the peculiarities of the apparatus according to the invention, to load bulky or heavy pieces on the working deck 2, the whole perimeter shield can be lowered and lifted.

In FIGS. 7-10 the apparatus according to the first embodiment is shown in transparency, i.e. having removed the shield panels to show the internal elements defining the movement elements for opening and closing the shield.

It should be noted that the three rear and side panels P1-P3 are mounted integral with each other and fixed to tracks B vertically slidable in guides G attached to the frame T. The vertical movement is ensured by an electric motor R1 which controls in rotation two opposed toothed gears R2, engaged on respective toothed racks R3, integral with the perimeter shield.

In the case where the front panel P4 is mounted movable and independent from the remaining shield portion, a system of dedicated guides and tracks is provided: in this case, a manual lifting system for the panel alone is sufficient, in view of the greater lightness, for example an articulated pantograph mechanism GF equipped with a pneumatic dampener GF1 that maintains the position of the panel P4 set manually by the operator. Alternatively, it is possible to provide a pneumatic or electric actuator, with automatic or manual control, which actively lifts and lowers the front panel.

The unrolling and rolling up movement of the shutter TP can also be motorized by known systems, for example by means of loop-mounted transmission belts within two upper side guides $TP_1$ and $TP_2$ along which the two side edges of the shutter TP slide.

Also for raising/lowering the upright 4a of the laser marker 4 an electric motor RR suitably controlled by industrial automation is preferably provided.

Figure 11:
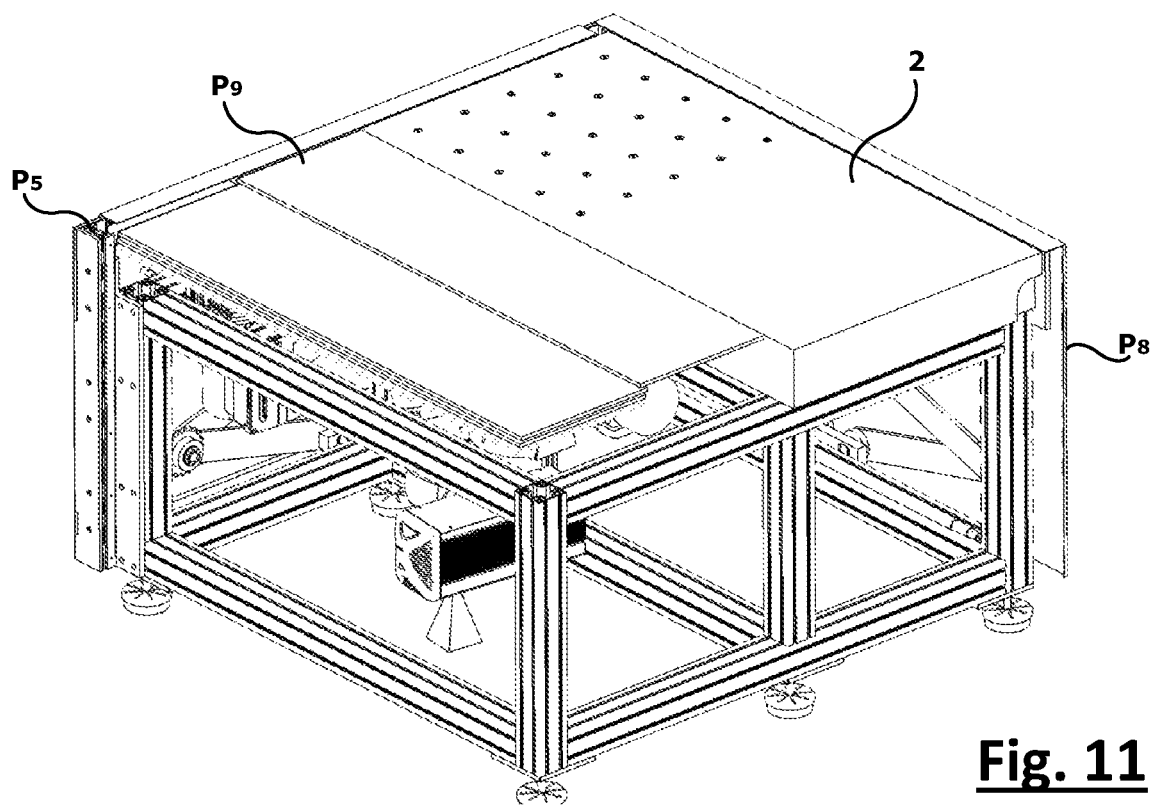
FIG. 11 is a perspective view, with removed parts, of the apparatus according to another embodiment of the invention in a lowered shield home condition.
Figure 12:
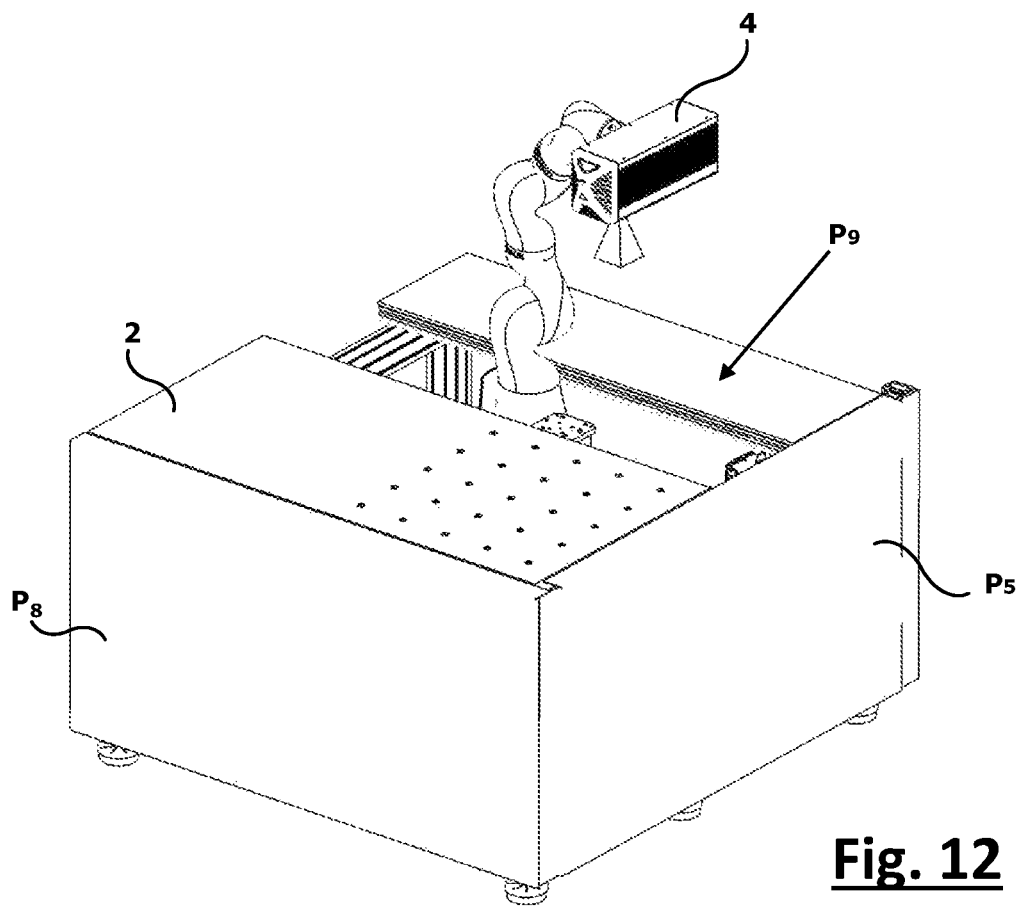
FIG. 12 is a perspective view of the apparatus of FIG. 11 in a set-up condition.
Figure 13:
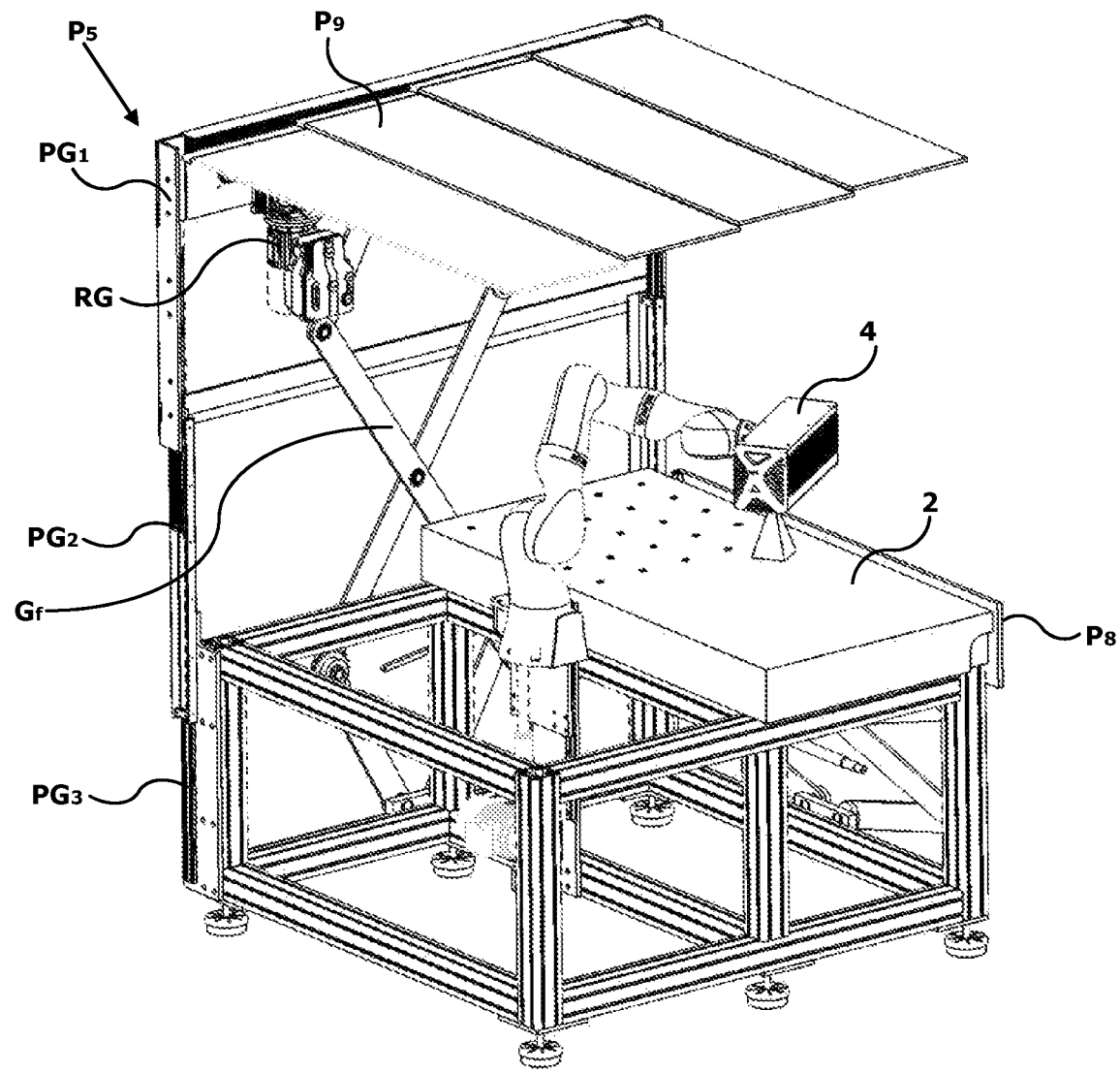
FIG. 13 is a perspective view, with removed parts, of the apparatus of FIG. 11 in a partial closing condition of the protection shield.

FIGS. 11-13 schematically illustrate a second embodiment of the invention.

Here the laser marking head 4 is mounted at the end of a robotic arm, which equivalently replaces the articulated system of FIG. 2, but is not decisive for the purposes of the teaching of the invention.

In this embodiment, the perimeter shield comprises composite panels P5, P6, P7 (a side panel P6 and the rear panel P7 are not shown in the figures), constituted by a system of contiguous sub-panels, arranged side-by-side and reciprocally sliding at least partly with a telescopic mechanism with respect to one another: this determines a mode of vertical extension of the side panels which is not defined by a single rigid displacement, but by mutual sliding of the sub-panels one adjacent the other.

To this end, the sub-panels are engaged with each other by sliding guides $PG_1$-$PG_3$ provided along the respective side edges. When the sub-panels of the same panel are superimposed on each other (see panel P5 in FIG. 11) in the lower part of the support frame, the smaller overall height is obtained. When, on the other hand, the sub-panels slide on each other and extend upwards of the maximum available travel, the panel takes the maximum extension in height (see the same panel P5 in FIG. 13). In the completely lowered configuration of the perimeter shield, therefore, only the external panel of each of the said telescopic movement systems is visible, while the other sub-panels of the same panel are staggered and arranged side-by-side inwards.

The innermost or outermost sub-panel of each panel is controlled according to a raising/lowering motion and, in this movement—upon reaching a predetermined stroke—it also draws the adjacent one and so progressively the more external or internal ones. Typically, it is believed that three sub-panels are sufficient for each perimeter shield panel. The controlled sub-panel is preferably moved by suitable lifting members, constituted by mechanical pantographs GF, driven by an electric motor RG and possibly supported by automatically controlled pneumatic dampers.

Preferably, at least the lower sub-panel (i.e. the one that remains in the lower part when the panel is extended upwards) is not rigid, but is in the form of a winding flexible shield, with a spring rewinding. The flexible shield is unrolled during the vertical movement upwards and rewinds due to the return spring, during the vertical movement downwards (in the shield closing phase).

The same construction is used both for the side panels P5-P7 and for a front panel P8.

In the preferred case in which the front panel P8 is mounted movable and independent of the remaining shield portion, an automatic or manual lifting system similar to that provided in the first embodiment is provided.

The upper side of the perimeter shield can also be equipped with a closing system P9 with a telescopic mechanism. In this case, to obtain the minimum covering dimensions of the extraction compartment of the laser marker 4, the mutually sliding sub-panels could be more than three, for example four.

The other components and operating methods are completely equivalent to those of the first embodiment.

This embodiment, by contemplating sub-panels arranged side-by-side (of which, possibly, a part that can be wound up) in the lowered home position, can have a perimeter shield of height much greater than the limit imposed by the height of the working deck 2.

The operation of the apparatus according to the invention involves lowering the shield to the lower limit, entirely below the working deck 2, when access to the deck 2 is required with bulky or heavy pieces (which require access from above with an overhead crane or from the side with a forklift). During operation, the shielding is in any case raised, so as to encircle and close at least laterally the area of the working deck 2, thus avoiding any accidental reflection of the laser beam outside the working area. If the laser source requires it, it is possible to build shield panels with materials that are particularly suitable for resisting or reducing reflections of the laser beam.

As can be easily understood, through the apparatus according to the invention, a high compactness and flexibility of the shield available to the laser marking head is achieved, therefore a much smaller operating space compared to the prior art, while allowing very easy access to the working deck also for large and heavy pieces.

Practical tests have demonstrated the perfect functionality of this protective apparatus, which can be used not only for a laser marking machine, but also for any other machine that operates with high power lasers on reduced size pieces.

The apparatus of the invention increases the flexibility of use of the laser marker and can be installed in areas without controlled access.

It is understood, however, that the invention is not to be considered as limited by the particular embodiments illustrated above, which represent only exemplary implementations of the same, but different variants are possible, concerning in particular the opening and closing modes of the shielding booth walls, all within the reach of a person skilled in the art, without departing from the scope of the invention itself, as defined by the following claims.

For example, although it is preferable that the laser marking head can re-enter the compartment below the working deck so as to remain more protected with respect to any interference with members for moving the workpieces that occupy the area above the work surface, this is not strictly necessary: the laser head could also be placed permanently above the working deck.

The invention claimed is:

1. A laser marking apparatus, comprising a support frame (T) of a working deck (2) and a laser marking head (4) operating above said working deck (2), and wherein, around said working deck, a protection shield is arranged which fully encircles the working area of said laser marking head (4) and provided with at least partly perimetrally upright arranged panels with respect to said working deck, characterized in that said panels (P1-P8) are mounted movable from a lower position, wherein said shield encircles said support frame (T) up to a height completely below or flush with the upper surface of said working deck (2), to an upper extended position wherein said shield encircles the area above said working deck (2) up to a working height of said laser marking head (4).

2. The apparatus according to claim 1, wherein said panels (P1-P4) are mounted vertically slidable with a rigid displacement.

3. The apparatus according to claim 1, wherein said panels (P5-P8) each consists of a plurality of sub-panels arranged side-by-side and wherein said plurality of sub-panels are at least partly mutually movable by means of a telescopic mechanism.

4. The apparatus according to claim 3, wherein at least part of said sub-panels are in the shape of winding flexible shields.

5. The apparatus according to claim 1, wherein at least one front panel (P4) is mounted movable autonomously of the other panels.

6. The apparatus according to claim 5, wherein said front panel (P4, P8) is mounted free to slide vertically and constrained by a pneumatic dampener (GF1) adjusted to support the weight of said panel and to inhibit the descent thereof due to gravity.

7. The apparatus according to claim 6, wherein at least one of said perimetrally upright arranged panels is spaced apart from said working deck (2) so as to define a vertical compartment (3) wherein said laser marking head (4) is movably housed.

8. The apparatus according to claim 7, wherein an upper opening of said compartment (3) is closable by at least part of an upper closing panel (TP, P9) when said perimetrally upright arranged panels are in said lower position.

9. The apparatus according to claim 1, wherein said panels also comprise an upper closing panel (TP, P9), extendable from a rear closed-up position to a front extended position.

10. The apparatus according to claim 9, wherein said upper closing panel is in the shape of a roller shutter (TP) or of a plurality of telescopically extendable sub-panels (P9).

\* \* \* \* \*